United States Patent [19]

Savage et al.

[11] Patent Number: 4,915,895

[45] Date of Patent: Apr. 10, 1990

[54] METHOD FOR MAKING A COMPOSITE TREAD FOR TRACK-LAYING VEHICLES

[75] Inventors: Russell C. Savage; Gary P. Zeller; Martin D. Skirha, all of Anderson, Ind.

[73] Assignee: General Motors Corporation, Detroit, Mich.

[21] Appl. No.: 257,589

[22] Filed: Oct. 14, 1988

Related U.S. Application Data

[62] Division of Ser. No. 126,896, Nov. 30, 1987, Pat. No. 4,844,561.

[51] Int. Cl.$^4$ .............................................. B29C 45/14
[52] U.S. Cl. ................................... 264/258; 264/275; 264/279.1; 264/328.2; 264/328.6
[58] Field of Search .................. 264/257, 271.1, 279.1, 264/274, 275, 258, 273, 274, 328.2, 328.6; 51/204; 305/35 R, 39

[56] References Cited

U.S. PATENT DOCUMENTS

| | | | |
|---|---|---|---|
| 1,886,839 | 11/1932 | Scheckel | 305/38 |
| 2,917,347 | 12/1959 | Reuter et al. | 305/38 |
| 3,602,364 | 8/1971 | Maglio | 305/35 R |
| 3,961,006 | 6/1976 | Brandis et al. | 264/279.1 |
| 4,216,682 | 8/1980 | Ban et al. | 164/97 |
| 4,526,905 | 7/1985 | Lucast et al. | 264/328.6 |

FOREIGN PATENT DOCUMENTS 2489209  3/1982  France .............................. 264/271.1

Primary Examiner—Willard Hoag
Attorney, Agent, or Firm—Randy W. Tung

[57] ABSTRACT

A composite tread member used in a track for a track-laying vehicle. The tread member is molded of a polymeric material reinforced with abrasion resistant monofilaments. It can be molded in a reaction injection molding process or in a resin transfer molding process by first placing a metal support member and a plurality of reinforcing monofilaments in the mold and then inject a polymeric matrix material into the mold. The reinforcing monofilaments used in our novel composite tread member can be a silicon carbide particle filled Nylon 12 monofilament or a monofilament formed by polyaramid fiber bundles extrusion coated with a polyamide material. The polymeric matrix material used in the composite tread member can be either a Nylon 6 RIM, a polyurethane RIM, or a polyurea RIM material. Our novel composite tread members have superior abrasion resistant properties and durability when compared to a conventional unreinforced tread member.

2 Claims, 1 Drawing Sheet

METHOD FOR MAKING A COMPOSITE TREAD FOR TRACK-LAYING VEHICLES

This is a division of application Ser. No. 126,896 filed on Nov. 30, 1987, now U.S. Pat. No. 4,844,561.

FIELD OF THE INVENTION

The present invention generally relates to a composite tread member for a track-laying vehicle and, more particularly, it is concerned with a composite tread member for a track-laying vehicle that is molded of a polymeric material reinforced with abrasion resistant monofilaments.

BACKGROUND OF THE INVENTION

Track-laying vehicles are broadly used in construction of military applications for their superior tracking capability is rough terrain. A track on a track-laying vehicle is under tremendous strain and severe wearing conditions when the vehicle is in operation. This is especially true with modern track-laying vehicles where the vehicle is expected to carry a high load and capable of superior acceleration and speed.

A track on a track-laying vehicle can be constructed with either an integral tread system or a replaceable tread system. In the integral tread system, a track is connected by many track units, each is molded of hard rubber material around a steel support member. A track with the integral tread system has the benefit of lightweight, however, the entire track must be replaced when the tread rubber surface is worn.

In a track equipped with replaceable tread members, individual tread members are connected by mechanical means to a permanent steel link unit and can be replaced when they are worn. The replaceable tread track can therefore be more easily maintained in the operation of a track-laying vehicle.

Conventional tread members are molded of hard rubber materials. The durability of the rubber and thus the lifetime of a tread is always a problem in the design of a track. The selection of the rubber material is a difficult task in that different performance requirements of a track-laying vehicle demand different properties of the rubber material. For instance, a high durometer hard rubber material used in molding a tread member works well at high speed on smooth roads but disintegrates quickly in rough terrain. On the other hand, a low durometer soft rubber material would work well in rough terrain but deteriorates quickly on smooth roads at high speeds.

The most commonly seen problems with rubber molded tread members are overheating which causes blowouts and catastrophic failure of the rubber, chunking where large pieces of the rubber materials fall off the tread member, and rapid wear due to the poor abrasion resistance of the rubber material. In military applications, the high thermal profile of rubber is also undesirable since a track-laying vehicle such as a tank can be easily detected in the dark by infrared detectors.

It is, therefore, an object of the present invention to provide a new composite tread member which can be used in a track-laying vehicle equipped with either an integral tread system or a replaceable tread system.

It is another object of the present invention to provide a composite material for the molding of a tread member used on a track-laying vehicle capable of long surface life and problem-free operations.

It is a further object of the present invention to provide a polymeric composite material for the molding of a tread member used on a track-laying vehicle capable of providing prolonged surface life without premature failures.

SUMMARY OF THE INVENTION

The present invention provides a new and novel composite tread member for a track-laying vehicle that is molded of a polymeric material, or a polymeric matrix material, reinforced with abrasion resistant monofilaments. The polymeric matrix material we have employed is a Nylon 6 based reaction injection molding (RIM) material. In our composite tread member, a metal support member in the shape of a binoculus is embedded in the polymeric material forming the back portion of the tread member. The binoculus-shaped metal support member functions as the mounting hardware such that the tread member may be connected to the track. Reinforcing monofilaments of substantial length and diameter are embedded in the polymeric matrix material forming the front portion, i.e., the portion constituting the wear surface of the tread member.

In the preferred embodiment of our invention, the reinforcing monofilaments we have used are Nylon 12 monofilaments loaded withh silicon carbide particles. Both Nylon 12 and silicon carbide have superior abrasion resistant properties. In an alternate embodiment of our invention, bundles of polyaramid fibers are coated with polyamide forming monofilaments. The polyaramid fibers are extrusion coated into monofilaments in such a way that the fibers are situated perpendicular to the wear surface of the tread member to provide maximum abrasion resistance.

Our novel composite tread members can be operated on a track-laying vehicle at an operating temperature that is at least 25° F. lower than the operating temperature of a conventional rubber tread member. Our composite tread members have performed with minimum cracking, chunking, or blowout problems after extensive testing in rough terrain. The tread members have demonstrated an average durability that is 50% longer than that for an unreinforced conventional tread member.

BRIEF DESCRIPTION OF THE DRAWINGS

Other objects, features and advantages of the present invention will become apparent upon consideration of the specification and the appended drawings in which.

DETAILED DESCRIPTION OF THE PREFERRED AND ALTERNATE EMBODIMENTS

Figure 1:
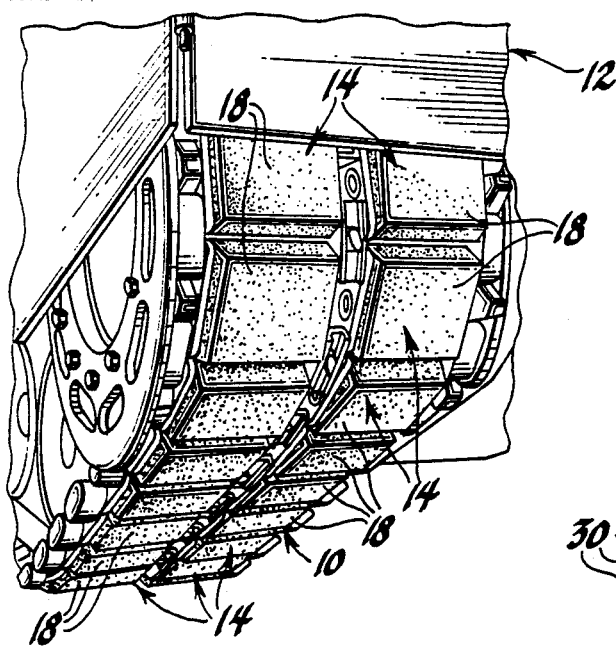
FIG. 1 is a perspective view showing a partial track mounted on a track-laying vehicle equipped with our composite tread members.
Figure 2:
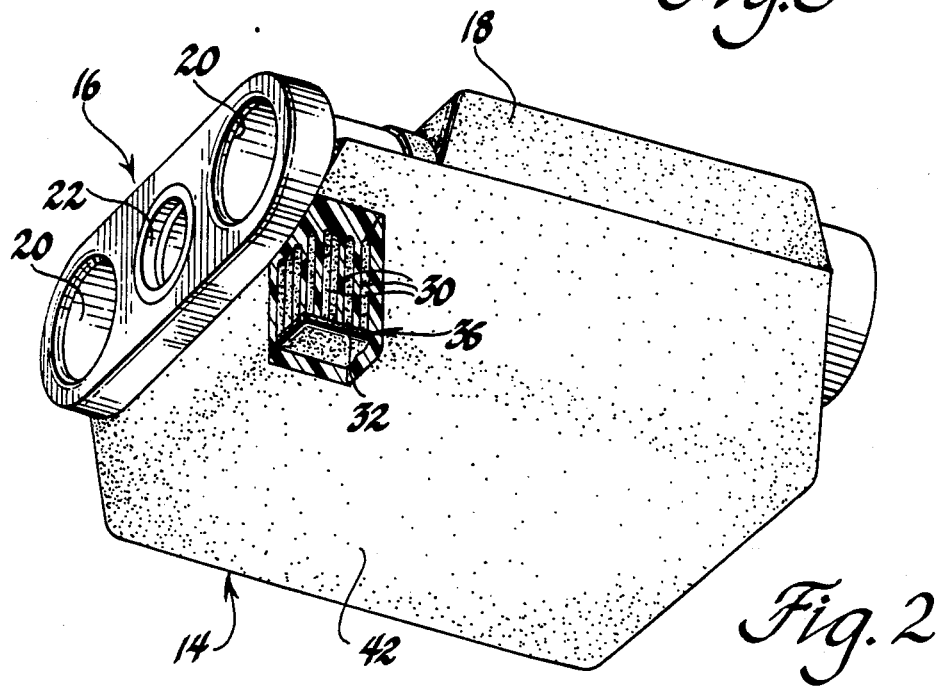
FIG. 2 is a perspective view of a composite tread member containing a partial cut-away view of the reinforcing monofilaments.

Referring initially to FIG. 1, a partial track 10 of a track-laying vehicle 12 is shown. Composite tread members 14 are mounted in track 10 by mechanical means. A perspective view of a composite tread member with a partial cut-away view is shown in FIG. 2. A metal support member 16 is embedded in the back portion of tread member 14 by the polymeric matrix material 18.

The metal support member 16 having a binoculus shape is equipped with mounting apertures 20 for connecting to the track and a heat dissipation aperture 22. The heat dissipation aperture 22 serves not only to dissipate heat generated in tread member 14 during operation, but also to minimize the amount of polymeric material used. We have also used metal support members that do not contain the heat dissipation aperture. Bolt members (not shown) are used to connect tread member 14 to track 10 (FIG. 1) through aperture 20. In the cut-away view in FIG. 2, which is also shown in FIG. 3 enlarged, a plurality of reinforcing monofilaments 30 are extruded Nylon 12 monofilaments filled with silicon carbide particles.

Figure 3:
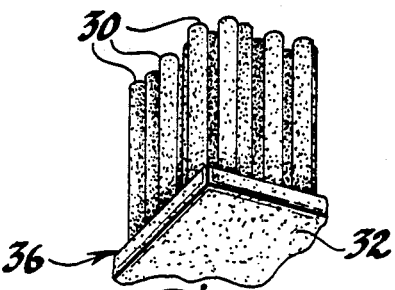
FIG. 3 is an enlarged view of the reinforcing monofilaments.

In FIG. 3, the length of our Nylon 12 monofilaments 30 is approximately 2 to 3 inches long and the diameters are approximately 0.060 to 0.090 inches. These monofilaments are extruded and then chopped to suitable length. The monofilaments are filled with 30 weight percent silicon carbide particles to further improve their abrasion resistance. As shown in FIG. 3, monofilaments 30, after chopped to suitable lengths, are cast in a polyurethane backing 32 to retain the positions of the monofilaments. Any other flexible polymeric material, e.g. castable elastomers, may work equally well as the backing material. A brush-like monofilament pad 36 is thus formed after the monofilaments 30 are cast in urethane backing 32.

In the next step of making our composite tread members, a multi-cavity Kirksite tool having a matched upper and lower mold members (not shown) gated at parting line is used for the RIM injection molding process. A more expensive aluminum or steel tool may also be used in place of the Kirksite tool. The interior mold surfaces of the upper and the lower mold members define a mold cavity. A monofilament pad 36 is first placed in the lower mold member with the polyurethane backing 32 facing the mold surface. A metal support member 16 is then placed on top of the monofilament pad 36. After the upper mold member is closed and locked onto the lower mold member forming a mold cavity containing pad 36 and metal support member 16, Nylon 6 RIM material is injected into the mold. A molded tread member 14 can be demolded after the RIM material is cured in approximately 3-5 minutes. The RIM injection molding process is conducted in a RIM machine or a RTM (Resin Transfer Molding) machine at low molding pressures between 50 to 100 psi. The Nylon 6 RIM components are kept in tanks at a temperature between 150°-200° F. with the mold temperature set at 250° F.

We have used two different types of Nylon 6 RIM material. Table I shows the formulation for a hard Nylon 6 RIM material having a Shore D durometer of 75-80. Table II shows the soft Nylon 6 RIM material which has a Shore D durometer between 35-38. We have made tread members from both the soft RIM formulation and the hard RIM formulation.

TABLE I

| HARD NYLON 6 RIM COMPOSITION | |
| --- | --- |
| | Parts by Weight |
| A-Part | |
| Polyether Polyol Prepolymer (Monsanto P-1) | 21.9 |
| Caprolactam (Nipro) | 27.1 |
| Antioxidant (Monsato Flectol ® H) | 0.5 |
| B-Part | |
| Caprolactam (Nipro) | 38.8 |

TABLE I-continued

| HARD NYLON 6 RIM COMPOSITION | |
| --- | --- |
| | Parts by Weight |
| Magnesium Bromide Catalyst (Monsanto C-1) | 11.2 |

TABLE II

| SOFT NYLON 6 RIM COMPOSITION | |
| --- | --- |
| | Parts by Weight |
| A-Part | |
| Polytetramethylene Polyol Prepolymer (Monsanto P-4) | 43.7 |
| Caprolactam (Nipro) | 5.4 |
| Antioxidant (Monsanto Flectol ® H) | 0.44 |
| B-Part | |
| Caprolactam (Nipro) | 42.5 |
| Magnesium Bromide Catalyst (Monsanto C-1) | 7.5 |

FIG. 2 shows a composite tread member injection molded of Nylon 6 RIM material. It is seen that Nylon 12 monofilaments 30 are oriented about perpendicularly to the wear surface 42 of tread member 14 to obtain the maximum abrasion resistance. The urethane backing 32 of the monofilament pad 36 is covered by a thin layer of Nylon 6 RIM material 18 on the wear surface 42. This thin layer of Nylon 6 RIM material wears out quickly in the initial operation of the tread to expose the more abrasion resistant monofilaments 30 on wear surface 42 such that maximum wear resistance of the composite tread member 14 can be realized.

Other materials can be used in place of Nylon 6 RIM as the polymeric matrix material in our composite tread members. For instance, polyurethane RIM, polyurea RIM or any other polymeric material that has good abrasion resistant property can be used. We have found specifically that polyurethane RIM and polyurea RIM work satisfactorily as the polymeric matrix material in our composite tread member.

We have utilized Nylon 12 monofilaments filled with silicon carbide particles as the reinforcing fibers in our preferred embodiment. However, any other wear resistant monofilaments made of polymeric materials with or without particulate fillers can be suitably used for the same purpose. These materials include but not necessarily limited to, Nylon 6, Nylon 66, polyolefin, etc.

In our alternate embodiment, monofilaments made by coating polyaramid fiber bundles with polyamide are used in place of the Nylon 12/silicon carbide monofilament. In this process, fiber bundles of polyaramid are pulled through an extrusion die and coated with a coating of molten polyamide. The thickness of the coating may be controlled as desired in this pressure extrusion process. We have found that a suitable size of our polyaramid/polyamide monofilaments is about 0.090 inch in diameter containing about 30 to 45 weight percent polyaramid. The polyaramid fiber bundles we have used is supplied by the DuPont company under the tradename of Kevlar ®. It is Kevlar ® 29 with a denier of 1500. Each Kevlar fiber bundles contain 7-10 ends per inch. The polyamides we have used are Nylon 66 and Nylon 12 of common extrusion grade. They can be obtained from any one of the numerous Nylon suppliers.

We have found that the polyaramid/polyamide monofilaments we used in our alternate embodiment has similar wear properties to the Nylon 12/silicon carbide monofilaments used in the preferred embodiment. They have both significantly increased the wear resistance of our composite tread members. Furthermore, the common operational problems associated with conventional rubber tread members are significantly reduced.

From the foregoing, it should be apparent that the present inventon provides a novel composite tread member that is far superior in properties and durability when compared to conventional unreinforced tread members.

While this invention has been described in an illustrative manner, it should be understood that the terminology used is intended to be in the nature of words of description rather than of limitation.

Furthermore, while our invention has been described in terms of a preferred and an alternate embodiment thereof, it is to be appreciated that those skilled in the art will readily apply these teachings to other possible variations of the invention.

The embodiments of the invention in which an exclusive property or privilege is claimed are defined as follows:

1. A method for making a composite tread member having a metal support member embedded in a monofilament reinforced polymeric material by a reaction injection molding process in a matched upper and lower mold members having interior mold surfaces defining a mold cavity therein comprising the steps of:
   a plurality of monofilaments in the lower mold member in an orientation such that said monofilaments being in an about perpendicular relationship to said interior mold surface of said lower mold member,
   said monofilament being selected from the group consisting a silicone carbide particle filled Nylon monofilament and a polyamide extrusion coated polyaramide fiber monofilament,
   placing a metal support member on top of said monofilaments,
   closing said upper mold member onto said lower mold member forming a mold cavity therein,
   injecting a quantity of a reaction injection moldable polymeric material into said mold cavity and thus embedding said monofilaments and said metal support member, and
   demolding said composite tread member after said polymeric material is cured in said mold cavity.

2. In the method of claim 1, said positioning step for the monofilaments further includes the step of casting said monofilaments in a flexible polymeric material backing forming a monofilament pad and then positioning said pad in said lower mold member.

* * * * *